METHOD OF AND APPARATUS FOR CRYPTOGRAPHY
Filed March 10, 1941 2 Sheets-Sheet 1
FIG. 1.
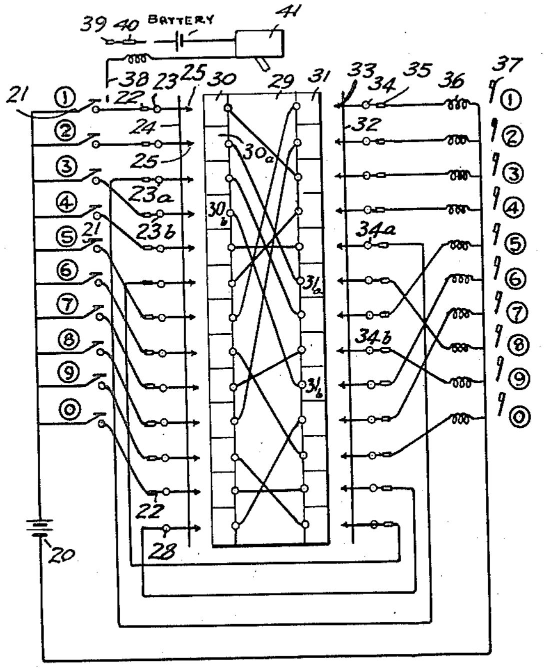
FIG. 4.
PLAIN TEXT W I R E S H I P P I N G
CIPHER TEXT B K D G X Q R H K E B N
FIG. 5.
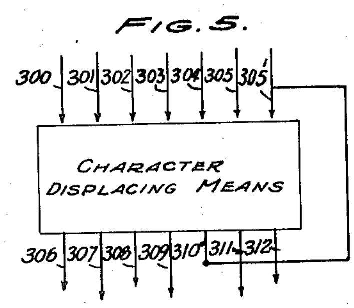
FIG. 6.
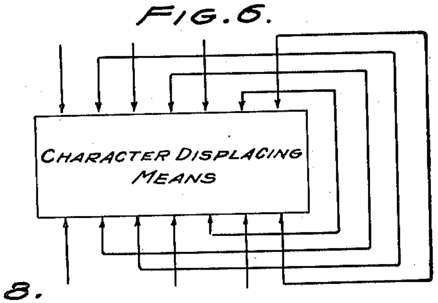
FIG. 8.
| | | | | | |
|---|---|---|---|---|---|
| PLAIN TEXT | I WILL | SEE YO | UAGAI | NNEXT | YEARX |
| CIPHER TEXT | A87KT | RSA3T | ABYCK | NR2X4 | SUZEX |
FIG. 3.
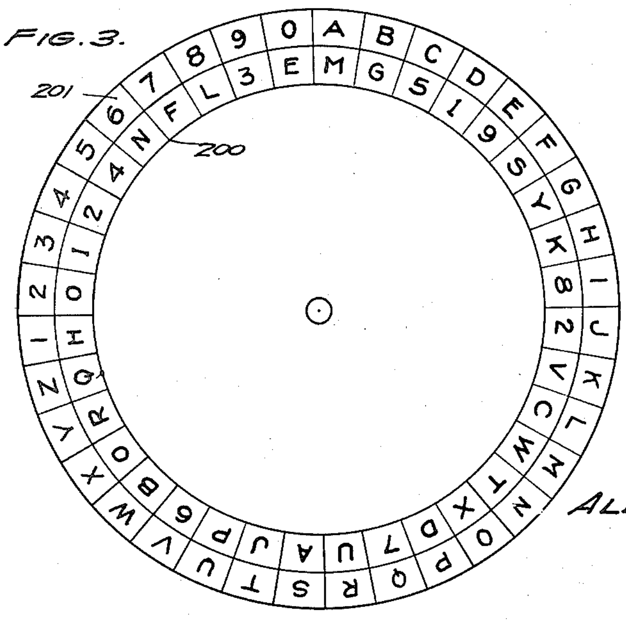
FIG. 7.
| A | E | I | O | U | Y | B | C |
|---|---|---|---|---|---|---|---|
| I | C | U | Y | B | O | E | A |
| Y | I | O | E | A | U | B | C |
| C | A | U | B | I | E | Y | O |
| B | I | E | C | U | O | A | Y |
| C | U | Y | I | A | B | O | E |
| I | O | C | B | E | A | U | Y |
| A | Y | E | U | B | I | O | C |
| O | U | I | E | C | A | Y | B |
INVENTOR
ALBERT W. SMALL
BY William D. Hall
ATTORNEY

METHOD OF AND APPARATUS FOR CRYPTOGRAPHY

Filed March 10, 1941 2 Sheets-Sheet 2

INVENTOR
ALBERT W. SMALL
BY William D. Hall.
ATTORNEY

United States Patent Office 2,964,856

Patented Dec. 20, 1960

2,964,856

METHOD OF AND APPARATUS FOR CRYPTOGRAPHY

Albert W. Small, Washington, D.C.

Filed Mar. 10, 1941, Ser. No. 382,561

11 Claims. (Cl. 35—4)

(Granted under Title 35, U.S. Code (1952), sec. 266)

The invention described herein may be manufactured and used by or for the Government for governmental purposes, without the payment to me of any royalty thereon.

This invention relates to cryptography and more particularly to highly secret methods of cryptography.

In the art of cryptography, it is common to change the letters (or other symbols) to other letters or symbols for the purpose of transmitting them. The party receiving the communication translates the coded or ciphered message to its original form. Generally a "key" is used to cipher and decipher the message.

The primary object of this invention is to provide a highly seceret coding method which cannot be solved by merely finding a "key." Other objects of my invention will become apparent as this description proceeds.

With my invention, part of the symbols are ciphered twice whereas the remainder are ciphered only once. Whether a particular symbol is to be ciphered only once or twice depends on the principle of operation of the ciphering machine and its adjustment.

In this art, a distinction is usually recognized between "coding" a message and "ciphering" one, however the principle of my invention is equally applicable to both and the words are used interchangeably herein. This specification was drafted considering "coding" and "ciphering" as equivalents and the appended claims are to be thus interpreted.

Figure 1 is a schematic view of one form of my invention with the end plates and the character displacing commutator shown in developed form. Plugs and jacks are used for certain connections.

Figure 3 illustrates a slide rule on which my novel method may be carried out.

Figure 4 shows a plain text and a code text that may be derived from the plain text when my novel method is used.

Figures 5 and 6 are diagrammatic views of two modified forms of my invention.

Figure 7 illustrates a cipher table with which my novel method may be used.

Figure 8 is illustrative of plain text and ciphered matter produced by my method and indicates with arrows that certain portions of the message were ciphered more than once.

Figure 2:
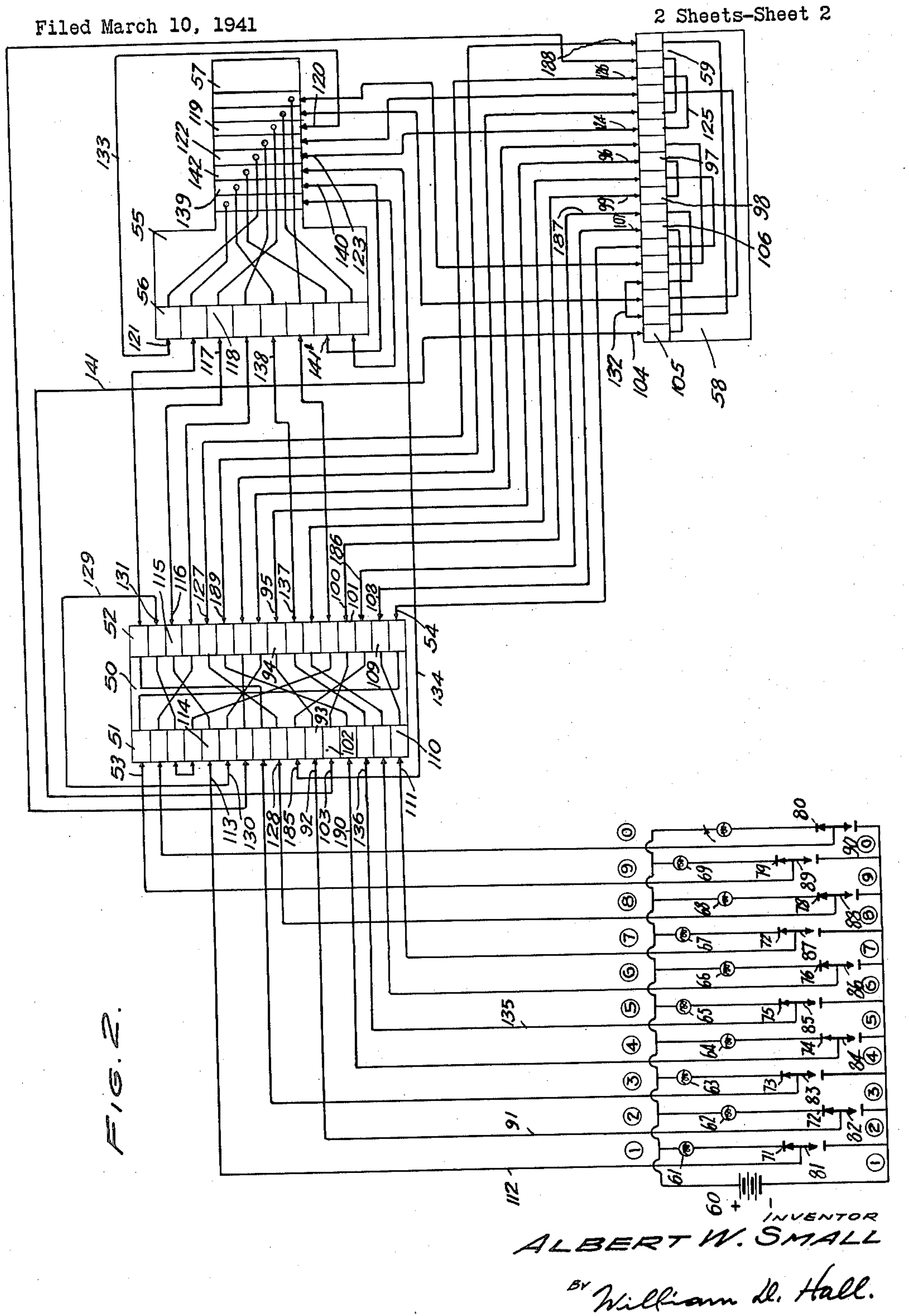
Figure 2 is a schematic view of a more complicated form of my invention.

In Figure 1, is shown a system for transmitting numbers, say 1, 2, 3, 4, 5, 6, 7, 8, 9, and 0, in a secret form. A transmitting keyboard includes a plurality of keys, such as 21, respectively designated 1 to 0, and each being arranged to close a circuit from battery 20 to a plug, such as 22, when depressed. A character displacing commutator 29 has input segments 30 and output segments 31 respectively randomly connected so that each of the input segments respectively connects to only one of the output segments. An end plate 24 supports a plurality of brushes, such as 25, each of which is electrically energized from a jack, such as 23. In similar fashion, an output end plate 32 has a plurality of brushes, such as 33, connected to jacks, such as 34. A plurality of output plugs, such as 35, electrically connect to a plurality of solenoids as at 36 that respectively operate a plurality of keys as at 37. These keys print numbers 1, 2, 3, 4, 5, 6, 7, 8, 9, 0 respectively. A member 38 is operated each time any key such as 21 is depressed and closes a circuit at contacts 39 and 40 and thereby causes apparatus 41 to rotate the communtator one or more spaces.

In the present position of the commutator, if key #1 is depressed, type printer #3 is actuated. Also the bar 38 is operated causing 41 to advance the commutator say one space in a clockwise direction (when viewed from the left). If key #1 is again depressed the printer #0 will be actuated this second time. With ordinary devices of the prior art the output numbers are displaced from the input numbers according to some simple law such as a particular law depending on how apparatus 41 advances the commutator. However, from time to time in my machine an input number is ciphered twice, that is to say, it goes through the character displacing commutator twice. For example, suppose the commutator is advanced until input segment **30*a* is in contact with the brush of #1 key. In this case the path of current through the machine is from key 1, segment 30*a*, segment 31*a*, to brush and jack 34*a*, to plug 23*a*, to 30*b*, to 31*b*, to jack 34*b***, and to printer #9. Since the input symbols are ciphered once part of the time and twice in other instances, the solution of the ciphered messages is very difficult.

The various input plugs may be plugged into the several input jacks in any order and similarly the output jacks may be inserted in the output jacks in any order. These facts enable a very large number of different adjustments of the machine. The order of plugs can be changed from time to time in order to confuse anyone trying to intercept the messages.

In certain positions of the commutator, it may be that certain of the symbols will be ciphered several times. Figure 8 shows plain text message and a cipher text message that might be obtained from a plain text message if a thirty-six character ciphering machine of the type shown in Figure 1 is employed. The arrows indicate that certain of the characters were ciphered twice by the machine. For example, in the first group the letter L was ciphered twice, in the second group the letter E was ciphered three times, and in the fourth group two adjacent letters, E and X, were both ciphered.

The party receiving the message may translate the same by use of a similar machine provided he plugs his input and output plugs 22 and 35 in the output and input jacks 34 and 23 respectively that correspond in order to the plug order used by the person ciphering the message.

In Figure 2 there is shown a character displacing element 50, input section commutator segments such as 51, and output segments such as 52. The plurality of input brushes such as 53, and output brushes such as 54, respectively cooperate with the segments such as 51 and 52. The commutators and associated brushes form one character displacing element. A second character displacing element 55 comprises a commutating portion 56, and a slip ring portion 57. Each segment of the commutating portion 56 is respectively connected to a slip ring of portion 57. A third character displacing element 58 comprises a plurality of commutating segments 59 randomly connected to each other. All three character displacing elements are rotated according to any desired law; for example, the element 50 may be rotated one segment each time a circuit is made through the battery 60, and the element 55 may be rotated according to the time of day, etc. The plurality of indicating lamps 61 to 70 inclusive are respectively connected to the poles 71 to 80 inclusive of the single pole double-throw switches 81 to 0 inclusive. The other poles of these switches are all onnected to the negative side of battery 60. The posi-ve side of the battery 60 is connected to the remaining des of the indicating lamps 61 to 70 inclusive.

The purpose of the machine is to cipher any message 'hich may be sent by operation of switches 81 to 90 and ave the resultant ciphered message indicated by the imps 61 to 70 according to a predetermined law. This iw is inherent in the machine, and accordingly the mes-ige may be deciphered by any other person having a milar machine, provided the second machine is adjusted › operate in the same manner as the first machine. In lace of the lamps 61 to 70 suitable solenoids may be sub-ituted and arranged to control typewriter keys so that ie output indications are not only merely indicated, but lso recorded in the form of a message. The various eys and lamps may be marked by suitable letters or num-ers; for example, respectively 1, 2, 3, 4, 5, 6, 7, 8, 9, 0. : it is desired to send letters instead of numbers twenty-x keys and twenty-six lamps may be provided so that ie entire alphabet may be sent. Should it be desired › send both letters and numbers thirty-six keys and lamps iould be provided. In event more than ten keys are sed, the number of segments on the commutators and the imber of slip rings preferably should be increased to ike care of the added letters.

If it is desired to cipher the number "21" on the ma-iine shown in Figure 2, the operation would be as fol-›ws, presuming that none of the commutators were ad-ınced during the ciphering procedure. Upon depress-g key 82 current would flow from the negative pole of ittery 60 to 82, wire 91, brush 92, segment 93, segment !, brush 95, brush 96, segment 97, segment 98, brush ), brush 100, segment 101, segment 102, brush 103, wire !1, brush 104, segment 105, segment 106, brush 107, ush 108, segment 109, segment 110, brush 111, switch 7, pole 77, lamp 67, and back to the positive pole battery ). Lamp 67 indicates number "7." It is noted that the irrent passed through the commutating element 50 and } two times. Ordinarily after depressing each key, one more of the commutating elements would be rotated ie or more spaces. However, for the purpose of mplicity in following the circuit, presuming none of the ımmutating elements were advanced, a circuit would be ade as follows upon depressing key 81 to cipher the imber "1"; negative pole of battery 60, switch 81, wire 2, brush 113, segment 114, segment 115, brush 116, ush 117, segment 118, slip ring 119, brush, 120, wire !3, brush 121, slip ring 122, brush 123, brush 124, wire !5, brush 126, brush 127, brush 128, switch 88, pole 78, mp 68, and back to the positive pole of battery 60. ence lamp "8" is energized. The ciphered text for "21" therefore "78" in the position and adjustments shown id described.

It is noted that there is a feed-back wire 129 associated ith the character displacing element 50, which at times uses current entering brushes 130 and 131 to pass rough the character displacing element 50 an additional ne. Similarly character displacing element 58 has a ed-back connection 132, which causes feed-back opera-ın in that element. As previously described in detail, feed-back wire 133 is associated with character displac-g element 55. There are feed-back connections such 134 connecting the output of element 55 to the input element 50. The operation of this feed-back connec-ın may be observed by tracing the circuit when key 85 depressed in order to cipher the number "5." The cur-nt path is as follows: battery 60, switch 85, wire 135, ush 136, brush 137, brush 138, slip ring 139, brush 140, ush 141', slip ring 142, feed-back wire 134, brush 185, ush 186, brush 187, feed-back wire 132, brush 188, ush 189, brush 190, switch 84, pole 74, lamp 64, and ick to the battery 60.

As was previously explained in connection with switch ! a feed-back wire 141 connects the output of character displacing element 58 with the input of character displac-ing element 50, and consequently whenever segment 105 of character displacing element 58 is energized the cur-rent is fed back into the input of character displacing element 50 and reciphered for the second time by char-acter displacing element 50. It is noted the output of each character displacing element has at least one con-nection to the input of each of the other two elements; consequently there are not only reciphermentss accom-plished by feed-back connections on each element, but by feed-back connections from other elements. The re-sultant arrangement ciphers a message according to such a complicated mathematical law that it is almost impos-sible for anyone intercepting the message to decipher the same according to any of the present methods of breaking messages down mathematically. As was explained in con-nection with Figure 1, plugs and jacks are used in con-nection with the various brushes and this enables a large number of adjustments to be made, each giving the ma-chine a different ciphered result for a given plain text message.

Figure 3 illustrates a slide rule on which the novel method of this invention may be carried out. The inner rotatable element 200 moves with respect to the outer stationary element 201. The elements are moved with respect to each other according to a pre-determined law and the character to be ciphered may be found on the element 201. The ciphered element will be found on element 200. Whenever upon reading a ciphered char-acter if it is found the same is a number, that number is reciphered one or more times until a letter is obtained. For example, to send the plain text message WIRE SHIPPING, the letter W is found to align with the ci-phered letter B. The element 200 is then rotated one space, so then letter I ciphers into letter K. Similarly, letters R, E, and S cipher into D, G, and X respectively. Upon ciphering letter H the number 5 is obtained, but 5 being a number, must be reciphered; and when thus reci-phered gives the letter Q. The next letter in the word SHIPPING is I, which also aligns with 5 after rotating the element 200 another space, and consequently upon recipherment the letter R is obtained. Ciphering letter P gives number 8, which when reciphered gives letter H. In ciphering the letter N of the word SHIPPING the inner element has been rotated ten spaces; hence, num-ber 1 aligns with letter N. Upon reciphering number 1, number 7 is obtained, which when reciphered gives let-ter B; hence in crypting this letter it was reciphered twice. When numbers are to be ciphered and are found in the plain text, they are ciphered or reciphered, as the case may be, until a figure is obtained. For ex-ample, if it is desired to cipher the number 6, which aligns with N, N is reciphered to give T, which is re-ciphered to give J, which when reciphered gives 2. Con-sequently, with the method of this invention the num-bers as well as the letters are reciphered from time to time so as to confuse those who would attempt to intercept the message.

In Figure 5 there is shown diagrammatically a method of carrying out the invention. In this figure, the input elements 300 to 305' are energized and randomly con-nected to the elements 306 to 312. However, whenever element 310 is energized, its output is fed back into the input element 305' for the purposes heretofore described, and reciphered. It will be understood that any type of character displacing means may be used in this phase of the invention; such as, for example, the commutating device of Figure 1, the slide rule of Figure 3, or the cipher table of Figure 7. Whenever a particular output element 310, which is for example the equivalent of plug 34*a* of Figure 1 or a number when letters are ciphered in Figure 3, or one of the spare output letters of Figure 7, the character is reciphered. In other words, a charac-ter is reciphered whenever a given output element is actuated. There are more input elements than output elements, hence at times an output indication may refer to either of two input indications. This tends to compress the output into a smaller alphabet than the input, and thereby tends to confuse unauthorized parties.

In Figure 6 a greater number of feed-back connections are used than there are input characters. This creates a system unusually difficult to decipher. For example, a machine designed for a thirty-six letter alphabet may be used for only ten numbers.

In Figure 7 is shown a cipher table with which the invention may be used. Certain letters A, E, I, O, U and Y are in the top row. There are also two feed-back letters B and C which will never be part of the messages to be ciphered. To cipher a message the operator uses letters in a pre-determined row below the top row. For example, he can drop down one row after transmitting each letter. For example, if one were to cipher the word "YOU" he would obtain "OEI." Whenever either of letters B or C occur in the ciphered output, the operator reciphers. He does this by selecting the letter corresponding to "B" (or "C" as the case may be) in the last two vertical rows. The manner of selecting the letter corresponding to "B" (or C) can be widely varied. One way is to select the "B" letter that is in the same horizontal row as that being ciphered. Another method is to cipher the first "B" letter as the first letter in the vertical "B" row and the second feed-back occurrence as the second letter in the vertical "B" row and so forth.

If "feed-back" were not used and it was desired to send "EAOI" one would send: "CYBE." Using "feed-back," the letters "C" and "B" must be reciphered and a typical result would be: "AYYE." It is far more difficult to decipher messages which had letters "fed back" than those ciphered without any feed-back actions.

While in several instances I have shown and referred to specific apparatus for displacing the characters and for effecting "feed back" I desire it distinctly understood that I am not limited thereto. The new "feed-back" principle is a very basic one and wherever applied is very confusing to those unauthorized persons who attempt to decode messages mathematically.

In order that the text may be deciphered by the party to whom it is intended it is necessary for it to be ciphered according to a pre-determined law. In this case that law is the inherent law of operation of the ciphering machine. It is a characteristic of the narrower aspects of this invention that the time of recurrence of the reciphered portions is in dependence on that inherent law. For example, in Figure 1, letters are reciphered whenever jack 34*a* is energized, and the energization of that jack depends on the inherent law of the machine as a whole. The broader aspects of my invention do not include a limitation to the effect that the time of recurrence of recipherment depends on the law of the ciphering machine.

In this invention, decipherment of a message is simply the reverese of ciphering and is in fact simply one phase of ciphering. The words "ciphering" and "coding" in the claims shall be construed broadly and shall include "deciphering" and "decoding."

I claim to have invented:

1. A cryptographing machine comprising a plurality of keys, a plurality of indicators, character-displacing means connecting the keys to the indicators, said character-displacing means having a greater number of input and output segments than there are keys and indicators respectively, and means connecting the extra output segments to the extra input segments whereby actuation of one of the extra output segments affects an input segment and causes an actuation of another output segment.

2. A cryptographing machine comprising character displacing means having plain text input elements and cipher text output elements, and additional means correlating one of the output character elements to one of the input elements, whereby when a plain text character actuates the said one output element the effect of said actuation is fed back to said one input element and again ciphered by the machine.

3. In a cryptographing machine, ciphering means including an input for receiving a plain text representation and an output providing a cipher text representation, and means intermittently feeding said cipher text representation again to said input, whereby at intermittent intervals a portion of the text is ciphered twice.

4. In an electrical cryptograph, a plurality of input jacks, a plurality of output jacks, character displacing means for connecting the input jacks electrically individually to output jacks, said means including means for changing the connections of said means intermittently, means adapted to plug in to the jacks for connecting two jacks to each other, a plurality of operating devices adapted to plug into and energize the jacks, and a plurality of indicators having connections adapted to plug into the jacks; whereby the plug-in features permitting a large variety of connections to be made including feed-back connections wherein various jacks may be connected to each other.

5. The method of utilizing a ciphering machine to cipher a message which includes frequently and intermittently selecting according to a predetermined rule limited portions of the message and reciphering those portions with said machine a greater number of times than the remainder of the message is ciphered.

6. The method of ciphering a message to effect a high degree of secrecy which includes ciphering different portions of the message selected according to a predetermined rule, with the same machine, different numbers of times.

7. The method of utilizing a ciphering machine that actuates its several output elements in accordance with a prescribed rule depending on the order of actuation of its several input elements, which includes reciphering a character whenever a given output element is actuated.

8. In a cryptographing machine, indicating means, cryptographing means including an output and an input and means for normally actuating the indicating means when a message is ciphered by the cryptographing means and for intermittently feeding the output of the cryptographing means to its input thereby to recipher the portion of message that was ciphered during such intermittent period.

9. In a cryptographic machine, means for displacing characters, said means having input and output elements and including a greater number of input elements than output elements, said means also including means whereby an output indication may refer to either of two input characters.

10. In a cryptographic device, a plurality of ciphering means including means for receiving a message input and an output for the enciphered equivalent thereof, and means intermittently feeding the enciphered message selectively to said input means thereby intermittently to encipher portions of said message further than other portions.

11. In a cryptographic device, a plurality of ciphering means normally acting in cascade relation to encipher a message each including input means for a message and output means for an enciphered message, and means intermittently feeding the enciphered message selectively to said input means thereby intermittently to encipher portions of said message further than other portions.

References Cited in the file of this patent

UNITED STATES PATENTS

| | | |
|---|---|---|
| 1,414,496 | Beyer | May 2, 1922 |
| 1,510,441 | Hebern | Sept. 30, 1924 |
| 1,533,252 | Koch | Apr. 14, 1925 |
| 2,139,676 | Friedman | Dec. 13, 1938 |

OTHER REFERENCES

Pickwick Papers, one page, photostat copy.